United States Patent
Feijoo et al.

(10) Patent No.: US 10,542,119 B2
(45) Date of Patent: Jan. 21, 2020

(54) MULTI-GEOGRAPHICAL PROCESSING OF USER REQUESTS

(71) Applicant: Citrix Systems, Inc., Fort Lauderdale, FL (US)

(72) Inventors: Ricardo Fernando Feijoo, Fort Lauderdale, FL (US); Nishil Prajapati, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 237 days.

(21) Appl. No.: 15/834,204

(22) Filed: Dec. 7, 2017

(65) Prior Publication Data

US 2019/0182352 A1    Jun. 13, 2019

(51) Int. Cl.
G06F 15/16 (2006.01)
H04L 29/08 (2006.01)
H04L 29/06 (2006.01)

(52) U.S. Cl.
CPC ............ *H04L 67/327* (2013.01); *H04L 67/42* (2013.01)

(58) Field of Classification Search
CPC ............................. H04L 67/327; H04L 67/42
USPC ....................................................... 709/203
See application file for complete search history.

(56) References Cited

U.S. PATENT DOCUMENTS

| | | | | |
|---|---|---|---|---|
| 7,486,943 B2* | 2/2009 | Choti | ................ | G06Q 10/0875 455/404.2 |
| 2014/0040343 A1* | 2/2014 | Nickolov | .............. | G06F 9/4856 709/201 |
| 2014/0108792 A1* | 4/2014 | Borzycki | ............ | G06F 21/6218 713/165 |
| 2016/0127384 A1* | 5/2016 | VoBa | ...................... | G06F 21/53 726/7 |

* cited by examiner

*Primary Examiner* — Atta Khan
(74) *Attorney, Agent, or Firm* — Banner & Witcoff, Ltd.

(57) ABSTRACT

Methods and systems for performing multi-geographical processing of user requests are described herein. An order service computing device may receive a user request associated with a user and, based on the user request, may generate a user account associated with the user. The order service computing device may establish the user account at a geographic computing platform which may provide access to one or more computing resources and/or services. The order service computing device may receive one or more access requests corresponding to one or more computing resources and/or services associated with the geographic computing platform and/or other geographic computing platforms. The order service computing device may generate identifiers based on the one or more access requests which identify the one or more computing resources and/or services.

17 Claims, 15 Drawing Sheets

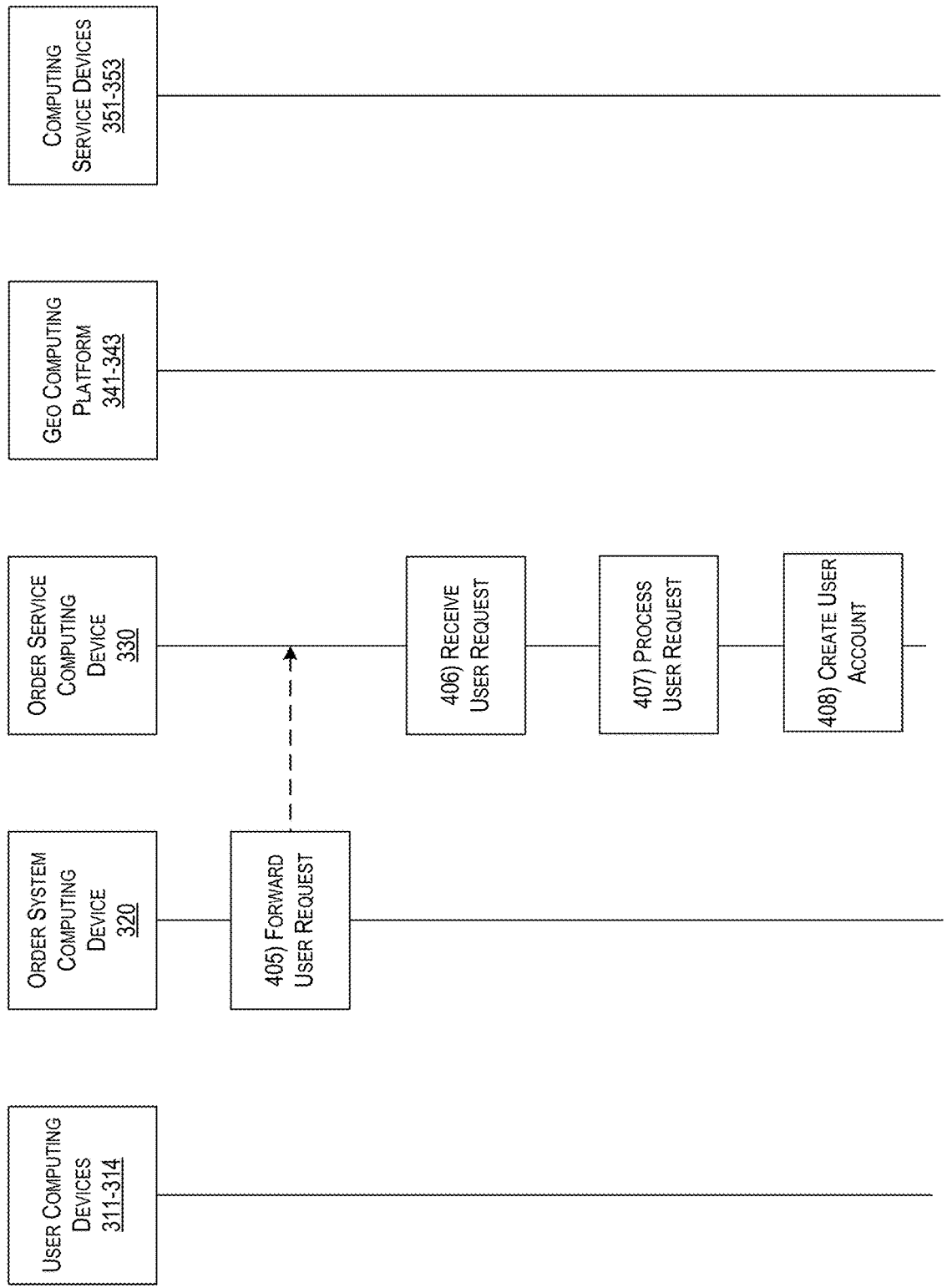

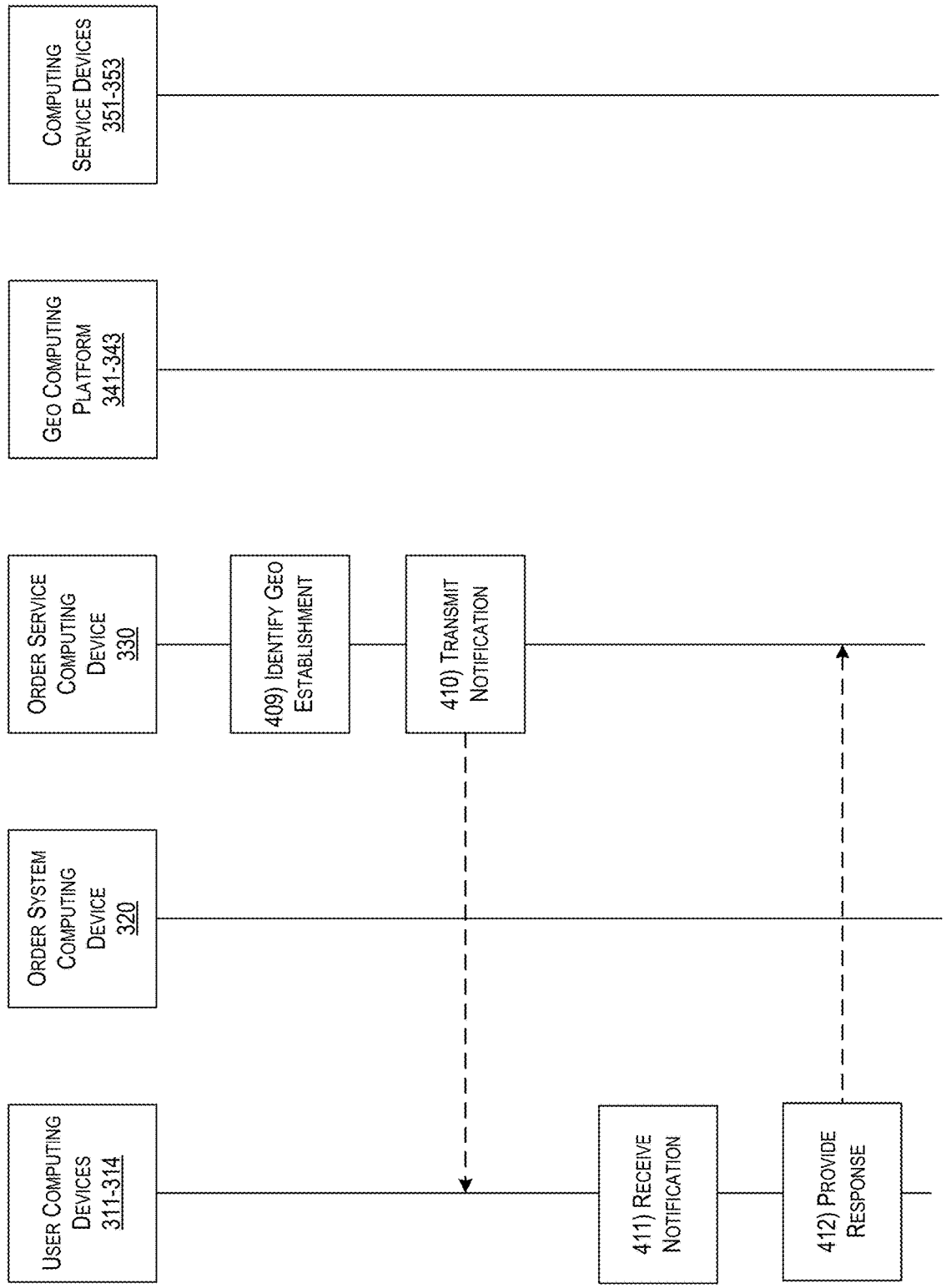

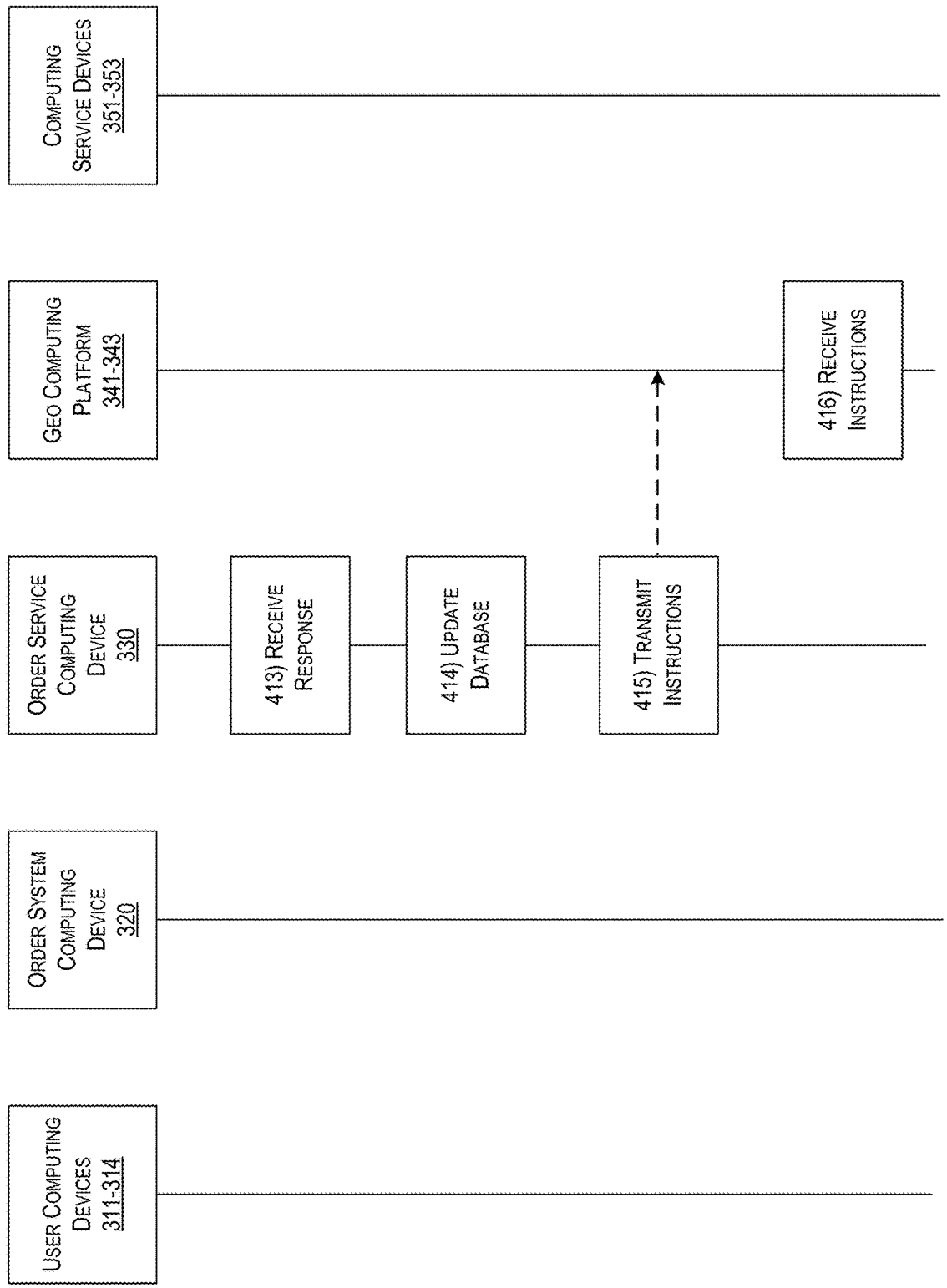

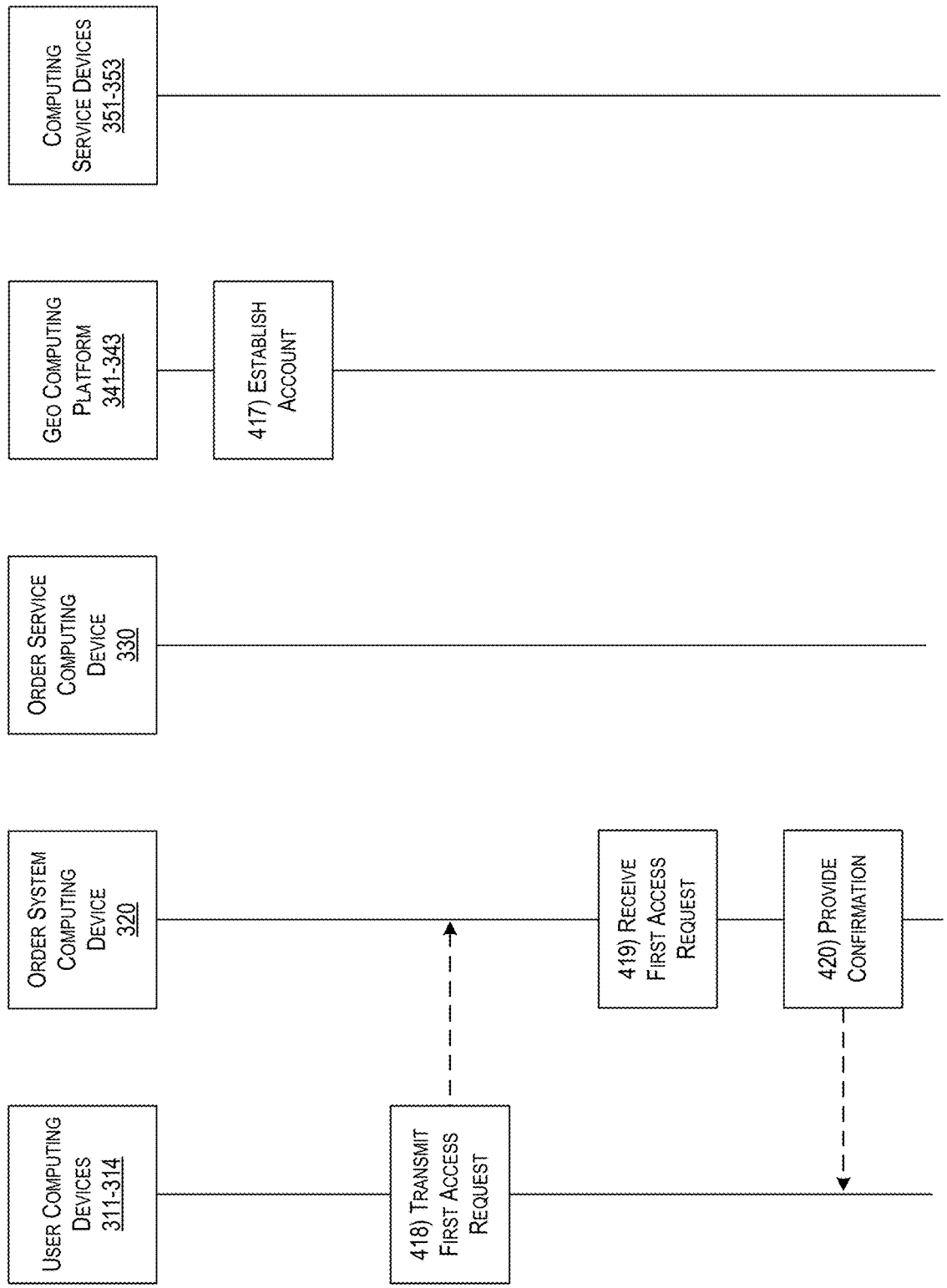

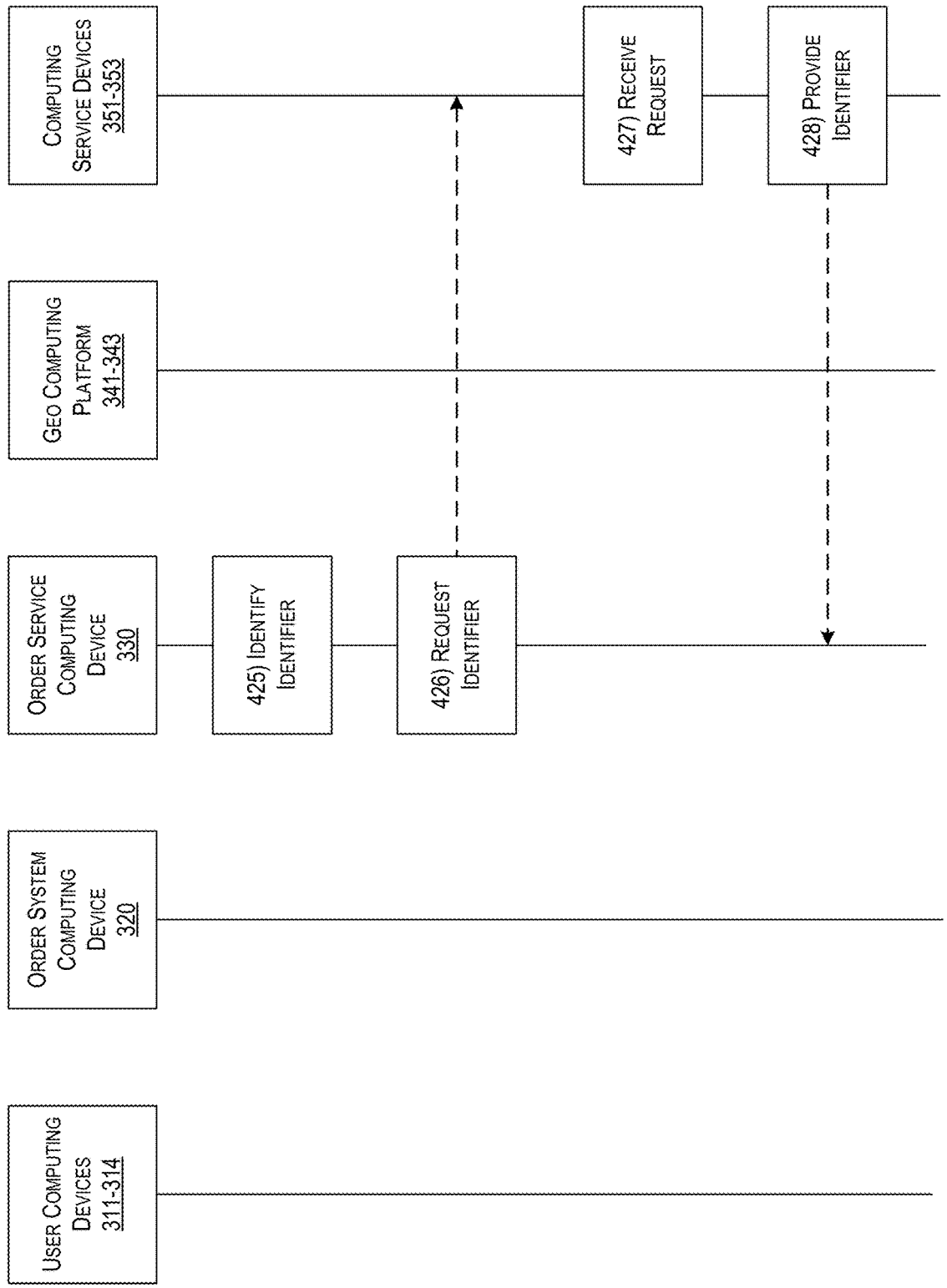

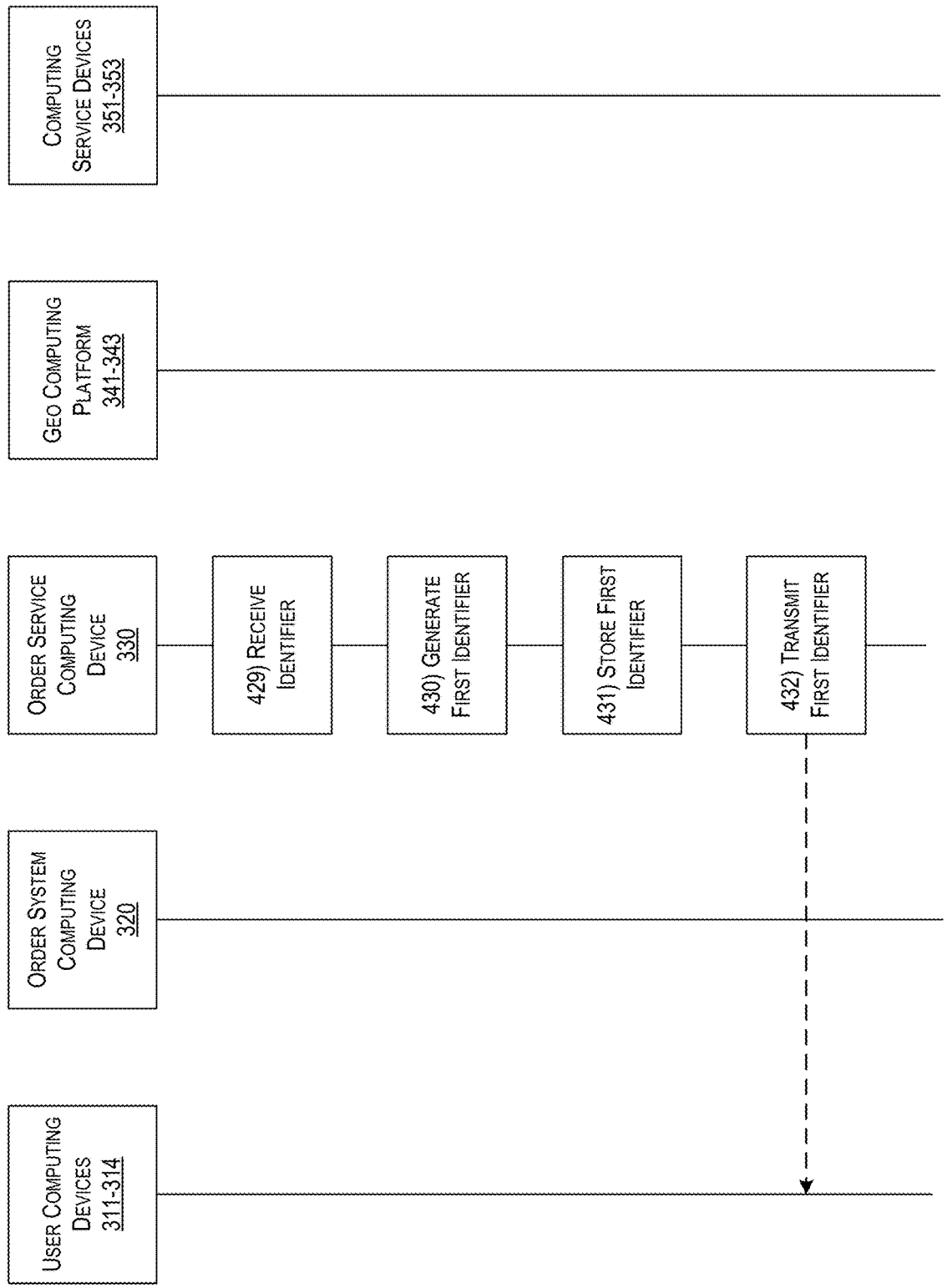

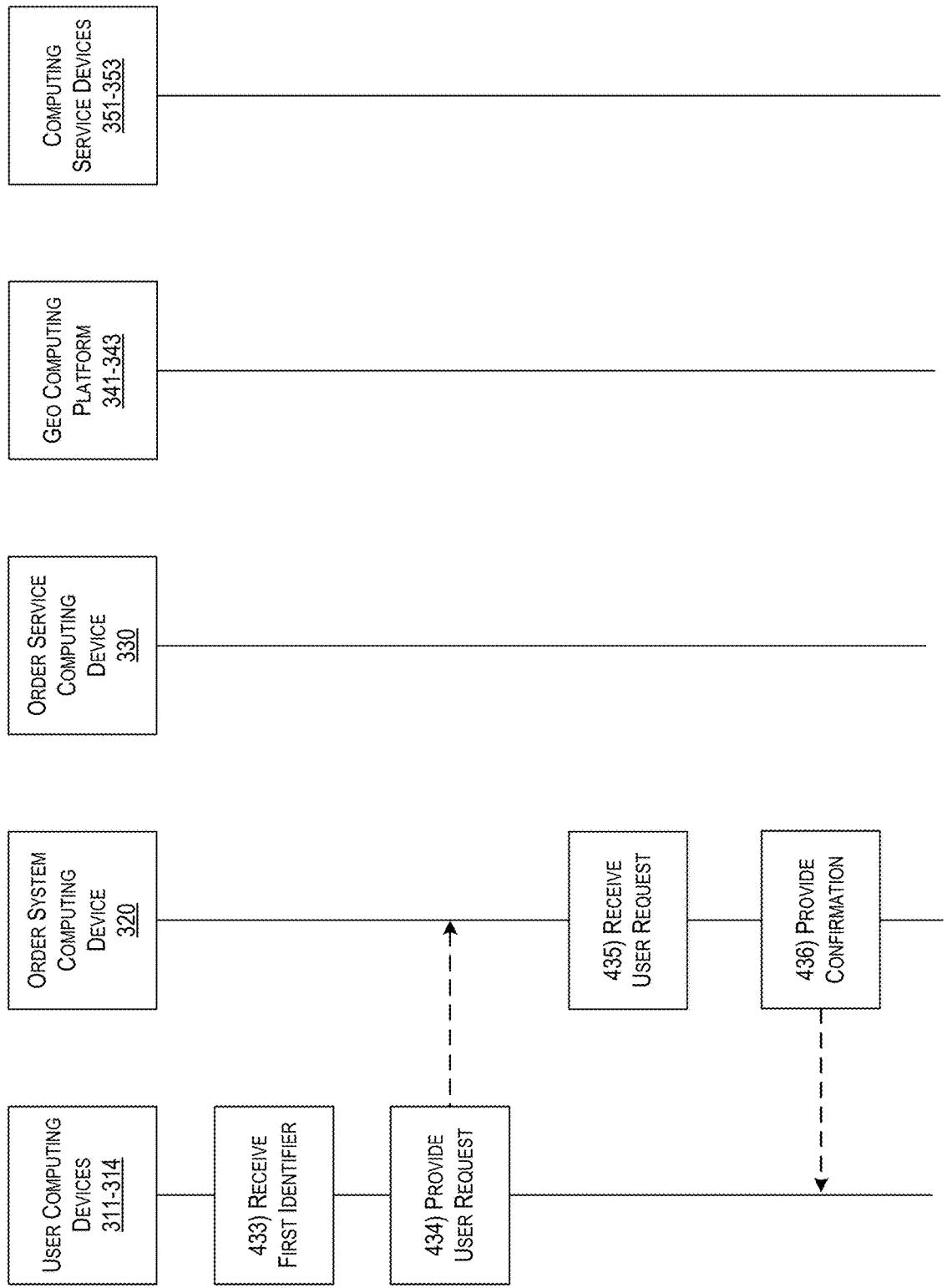

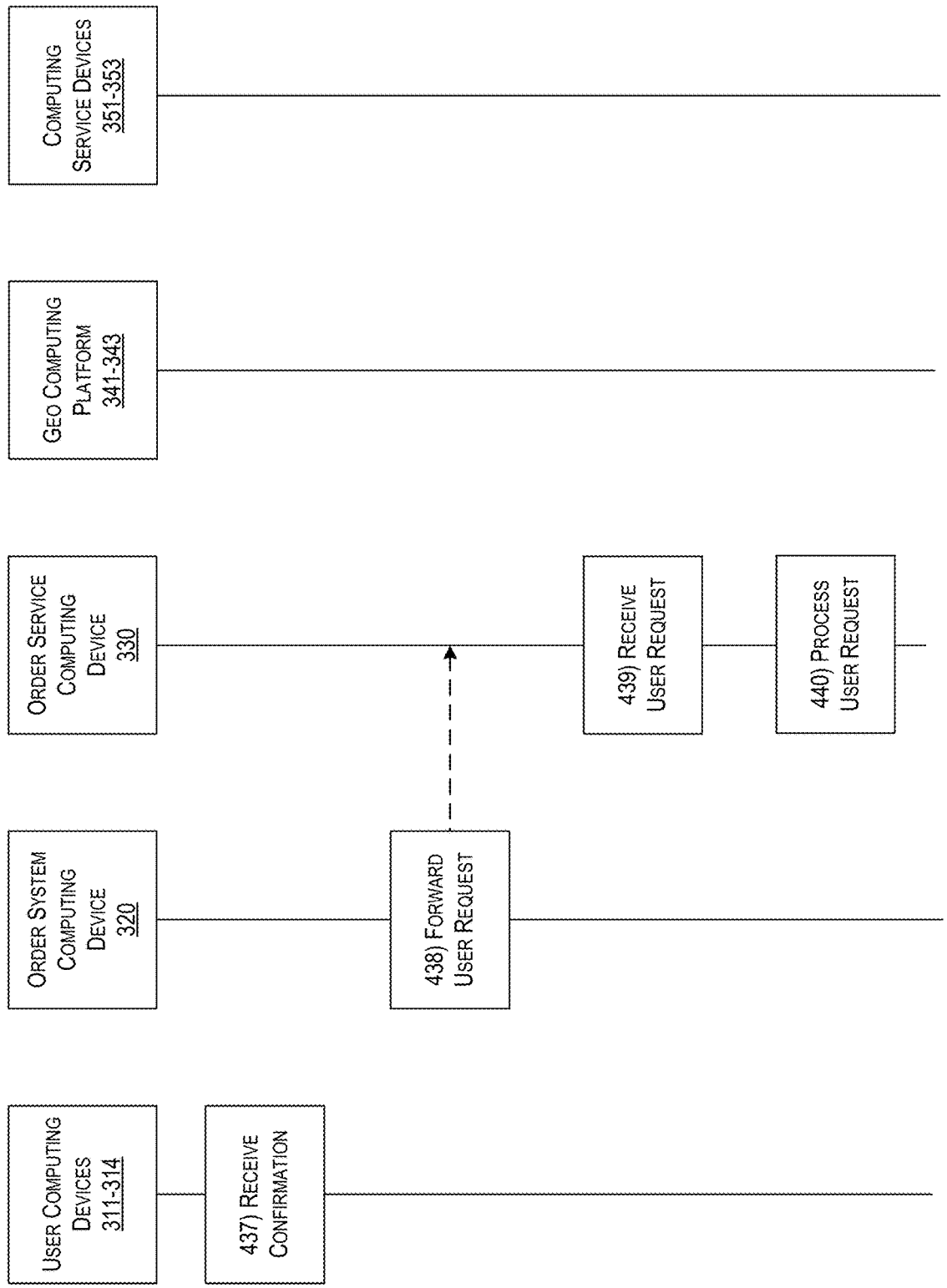

MULTI-GEOGRAPHICAL PROCESSING OF USER REQUESTS

FIELD

Aspects described herein generally relate to computers, networking, hardware, and software. In particular, one or more aspects of the disclosure relate to processing user requests over a distributed or cloud-based system occupying multiple geographical regions.

BACKGROUND

Entities, such as companies and/or enterprise organizations, offering computing services ranging from data storage to cloud services may have operations across a plurality of disparate geographical regions. In some instances, the computing services offered by the entities may vary across one or more of the plurality of geographical regions in which the entities operate, wherein certain geographical regions may be directly responsible for the management and/or hosting of particular computing services, but other geographical regions might not provide such offers. Due to legal and technological constraints, onboarding of users may be associated with a particular geographical region. However, users may require computing services that are not offered at the particular geographical region where they are onboarded. Accordingly, in order to meet user computing service needs, fulfillment of user requests for computing services may involve provisioning computing services provided across a plurality of disparate geographical regions.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems and methods for performing multi-geographical processing of user requests.

In accordance with one or more embodiments, an order service computing device may receive, from an order system computing device, a first user request associated with a user. Based on the first user request, the order service computing device may generate a user account associated with the user. The order service computing device may establish the user account at a first geo computing platform of a plurality of geo computing platforms, wherein each geo computing platform of the plurality of geo computing platforms provides access to one or more resources. The order service computing device may receive, from the order system computing device, a first access request a first access request for a first resource corresponding to the first geo computing platform and second access request for a second resource corresponding to a second geo computing platform, wherein the first access request and second access request are associated with the user account. The order service computing device may generate a first identifier that identifies the first resource corresponding to the first geo computing platform from the first access request and a second identifier that identifies the second resource corresponding to the second geo computing platform from the second access request.

In some embodiments, the order service computing device may receive, from the order system computing device, a third access request for a third resource corresponding to a third geo computing platform, wherein the third access request is associated with the user account. The order service computing device may generate a third identifier that identifies the third resource corresponding to the third geo computing platform from the third access request.

In some embodiments, the order service computing device may identify that the first user request is not associated with an existing account established in a geo computing platform of the plurality of geo computing platforms. The order service computing device may transmit a notification to a user computing device associated with the user request, wherein the notification includes a geo computing platform prompt. Based on the geo computing platform prompt, the order service computing device may receive, from the user computing device, a selection of the first geo computing platform of the plurality of geo computing platforms.

In some embodiments, the user account associated with the user comprises the first identifier and the second identifier.

In some embodiments, the order service computing device may receive, from the order system computing device, a second user request associated with the user account, wherein the second user request comprises an update to one of the first access request and the second access request. Based on the update, the order service computing device may update one of the first identifier and the second identifier.

In some embodiments, the first identifier provides access to the first resource corresponding to the first geo computing platform and the second identifier provides access to the second resource corresponding to the second geo computing platform.

In some embodiments, the first geo computing platform and the second geo computing platform are located in different geographical regions and the first identifier is a first logical serial number and the second identifier is a second logical serial number.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 4A, 4B, 4C, 4D, 4E, 4F, 4G, 4H, 4I, and 4J depict an illustrative event sequence performed by the illustrative multi-geographical user request processing system that may be used in accordance with one or more aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards a multi-geographical (e.g., multi-geo) user request processing system configured to process a user request and establish an account associated with a user at a particular geographical region. Furthermore, the multi-geo user request processing system may be configured to link the user account to one or more service offerings distributed across one or more geographical regions.

In particular, the multi-geo user request processing system may receive the user request from a user computing device associated with the user. The multi-geo user request processing system may generate the user account based on the user request and may further transmit a notification to the user computing device corresponding to the user account. The notification may include one or more communicative portals through which the user may be able to establish the user account at a computing platform of a particular geographic region. The multi-geo user request processing system may further receive one or more access requests from the user computing device for one or more service offerings distributed across computing platforms of a plurality of geographic regions. The multi-geo user request processing system may generate one or more identifiers corresponding to the one or more service offerings indicated by the one or more access requests. In doing so, the multi-geo user request processing system may link the user account to each of the one or more service offerings across the plurality of geographical regions through the one or more identifiers.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
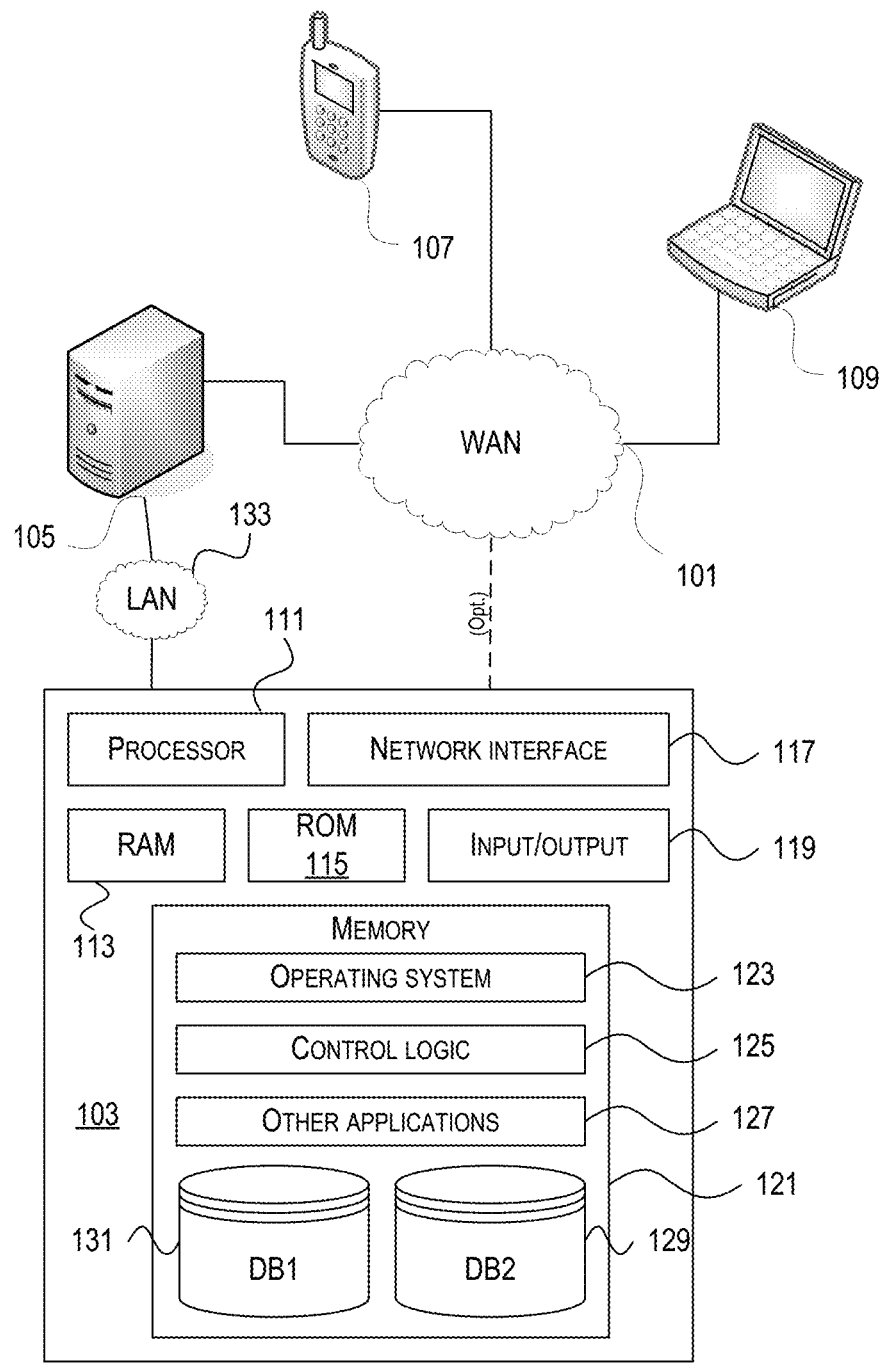
FIG. 1 depicts an illustrative computer system architecture that may be used in accordance with one or more aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
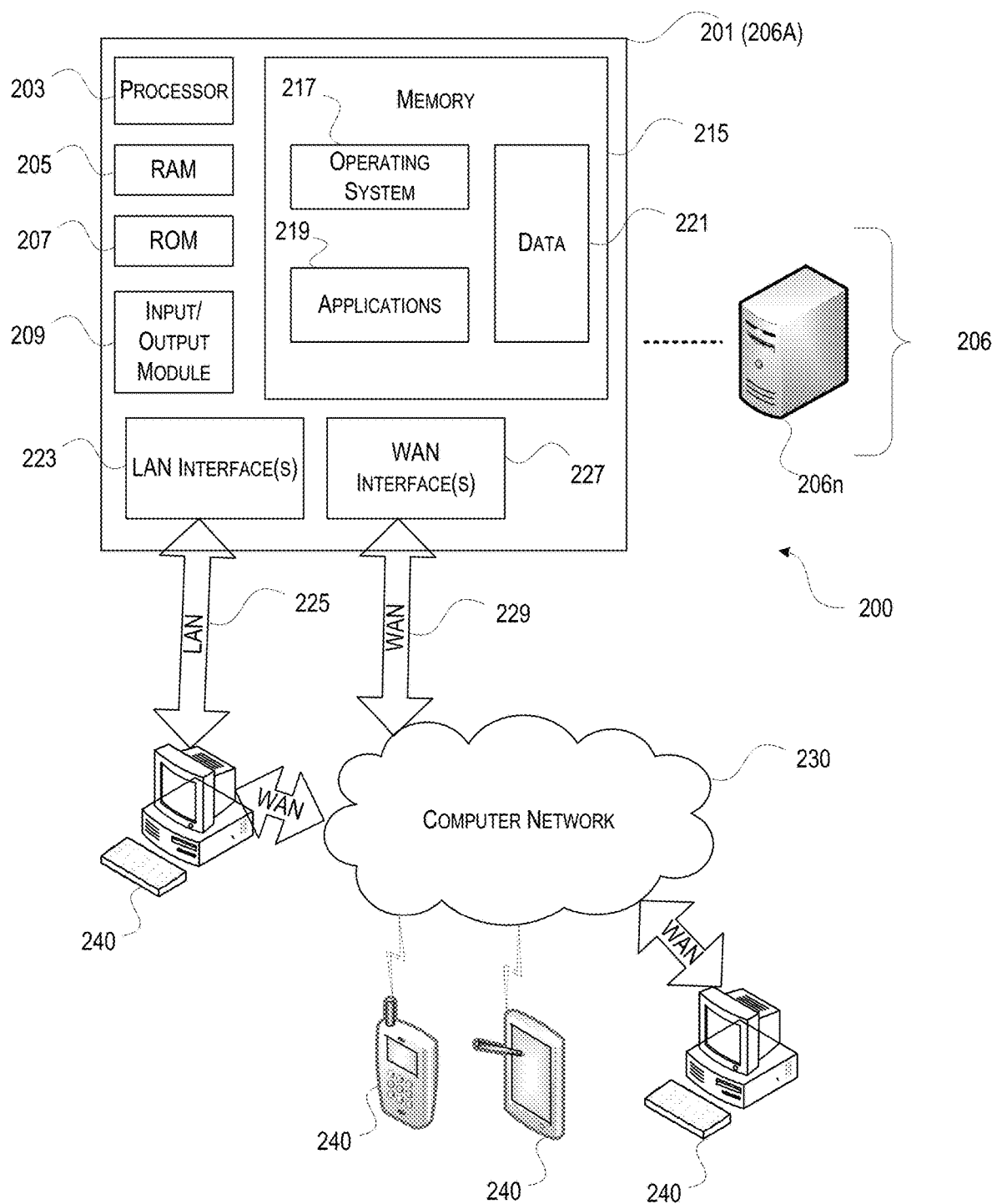
FIG. 2 depicts an illustrative remote-access system architecture that may be used in accordance with one or more aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Multi-Geographical Processing of User Requests

Figure 3A:
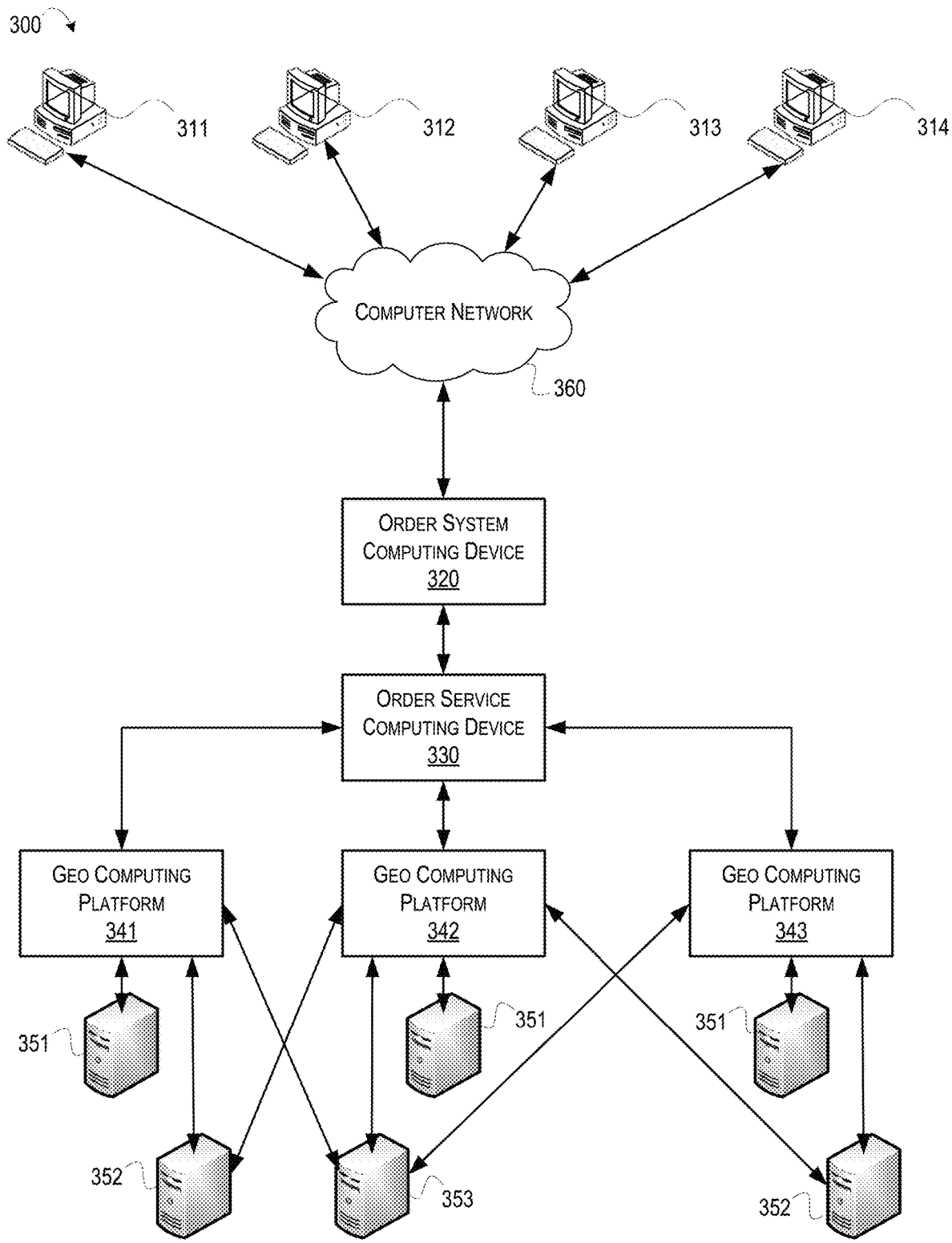
FIGS. 3A and 3B respectively depict an illustrative multi-geographical user request processing system and an illustrative order service computing device that may be used in accordance with one or more aspects described herein.

FIG. 3A depicts an illustrative multi-geographical user request processing system 300 that may be used in accordance with one or more aspects described herein. Referring to FIG. 3, multi-geo user request processing system 300 may include one or more computing devices and/or other computer systems. For example, multi-geo user request processing system 300 may include at least user computing devices 311-314, order system computing device 320, order service computing device 330, geographical computing platforms (e.g., geo computing platforms) 341-343, and computing service devices 351-353. In some instances, multi-geo user request processing system 300 may include additional computing devices similar to user computing devices 311-314, order system computing device 320, order service computing device 330, geo computing platforms 341-343, and/or computing service devices 351-353. Each of user computing devices 311-314, order system computing device 320, order service computing device 330, geo computing platforms 341-343, and computing service devices 351-353 may be any of desktop computer(s), laptop computer(s), tablet computer(s), smart phone(s), server(s), server blade(s), mainframe(s), virtual machine(s), and the like.

Multi-geo user request processing system 300 may also include one or more networks, such as computer network 360, which may include one or more sub-networks (e.g., LANs, WANs, VPNs, or the like). User computing devices 311-314 may be configured to communicate with order system computing device 320 through computer network 360 or another computer network. In some arrangements, user computing devices 311-314 may also be configured to communicate with order service computing device 330, geo computing platforms 341-343, and/or computing service devices 351-353 through computer network 360 or another computer network. Additionally, order system computing device 320, order service computing device 330, computing platforms 341-343, and/or computing service device devices 351-353 may be configured to communicate with each other through one or more networks and/or sub-networks similar to those described with respect to computer network 360.

User computing devices 311-314 may be associated with a user and/or distinct entity such as a company, school, government, and the like, and may be configured to perform one or more of the functions described herein. For example, user computing devices 311-314 may be configured to transmit information to and receive information from one or more of order system computing device 320, order service computing device 330, geo computing platforms 341-343, and computing service devices 351-353. Such information may relate to user requests and access requests provided by user computing devices 311-314 and notifications provided by one or more of order system computing device 320, order service computing device 330, geo computing platforms 341-343, and computing service devices 351-353. Through transmission of user requests and/or access requests, user computing devices 311-314 may initiate account registration and computer service and/or computer resource access through order system computing device 320, order service computing device 330, geo computing platforms 341-343, and/or computing service devices 351-353.

Order system computing device 320 may be established at a specific locality and may be configured to interface with user computing devices 311-314, order service computing device 330, geo computing platforms 341-343, and computing service devices 351-353 in performing one or more of the functions described herein. In some instances, order system computing device 320 may be configured to receive user requests and access requests from user computing devices 311-314 and transmit such requests to one or more of order service computing device 330, geo computing platforms 341-343, and computing service devices 351-353. Order system computing device 320 may further be configured to transmit notifications to user computing devices 311-314 regarding the user requests and access requests.

Order service computing device 330 may be established at either a same or different locality as order system computing device 320 and may be configured to receive user requests and access requests from one or more of user computing devices 311-314 and order system computing device 320. Based on an initial and/or first order request, order service computing device 330 may be configured to generate a user account associated with a user of one or more of user computing devices 311-314, and establish the user account at a particular geo computing platform 341-343. Based on one or more access requests, which may correspond to one or more computing service devices 351-353, order service computing device 330 may be further configured to generate one or more logical serial numbers identifying the one or more computing service devices 351-353. As will be described in further detail below, order service computing device 330 may be configured to perform additional functions in multi-geo user request processing system 300.

Geo computing platforms 341-343 may be geographically specific computing platforms which provide access to and/or host one or more computing service devices 351-353. As such, each of geo computing platforms 341-343 may be distributed across disparate geographical regions and may provide access to and/or host one or more computing service devices 351-353 that may be unique to the particular geographical region and/or distributed across a plurality of geographical regions. As an illustrative example, geo computing platforms 341 and 343 may provide access to and/or host computing service devices 351 and 352, and geo computing platform 342 may provide access to and/or host computing service devices 351 and 353. It should be understood, however, that a number of geo computing platforms 341-343 and computing service devices 351-353 greater or less than that depicted in FIG. 3A may be included in multi-geo user request processing system 300 and that the distribution of computing service devices across geo computing platforms may be different.

In some arrangements, one of geo computing platforms 341-343 may be selected by a user of at least one of user computing devices 311-314 to serve as a base geo computing platform. In such arrangements, data generated by the user computing devices 311-314 during usage of computing service devices 351-353 may be stored at the base geo computing platform. In some instances, the data generated by the user computing devices 311-314 during usage of computing service devices 351-353 may be stored at the base geo computing platform even if one or more of the computing service devices 351-353 are associated with different geo computing platforms 341-343 than the base geo computing platform selected by the user.

Computing service devices 351-353 may be configured to provide particular computing resources and/or computing services to user computing devices 311-314. Such computing resources and/or computing services may include data storage, cloud computing services, content management and distribution, virtual private network (e.g., VPN) services, infrastructure-as-a-service (e.g., Iaas), platform-as-a-service (e.g., PaaS), software-as-a-service (e.g., SaaS), database access and management, and the like. In some instances, each of computing service devices 351-353 may be configured to provide particular computing resources and/or computing services. For instance, as an illustrative example, computing service device 351 may be configured to provide data storage, computing service device 352 may be configured to provide VPN services, and computing service device 353 may be configured to provide cloud computing services. As such, and as noted above, a particular computing resource and/or computing service provided by a particular computing service device of computing service devices 351-353 may be unique to a particular geo computing platform 341-343.

As stated above, multi-geo user request processing system 300 also may include one or more networks, which may interconnect one or more of user computing devices 311-314, order system computing device 320, order service computing device 330, geo computing platforms 341-343, and computing service devices 351-353. For example, multi-geo user request processing system 300 may include network 360. Network 360 may include one or more sub-networks (e.g., local area networks (LANs), wide area networks (WANs), or the like).

As will be described in further detail below, each of user computing devices 311-314, order system computing device 320, order service computing device 330, geo computing platforms 341-343, and computing service devices 351-353 may be configured to interact in order to generate a user account, establish the user account at a particular geographical region, and provide the user account with one or more computing resources and/or computing services. Such processes, in part, may be facilitated by order service computing device 330. In doing so, order service computing device 330 may operate on the backend to generate the user account, establish the user account at a particular geographical region, and provide the user account with access to one or more computing resources and/or computing services and thereby enable order system computing device 320 to interface with user computing devices 311-314 and abide by legal and technological constraints regarding the immediate receipt and confirmation of user requests and access requests.

Figure 3B:
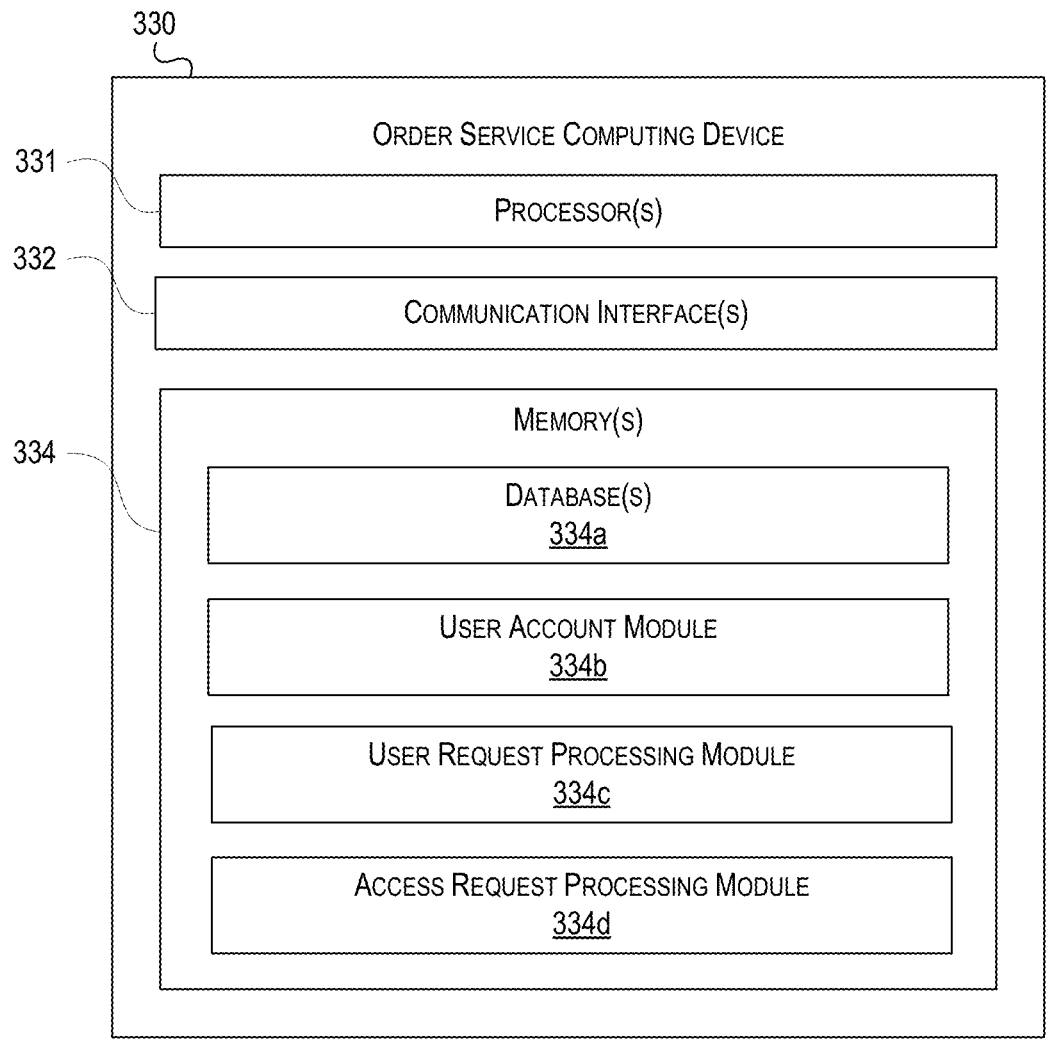

FIG. 3B depicts an illustrative order service computing device 330 that may be used in accordance with one or more aspects described herein. Referring to FIG. 3B, order service computing device 330 may include at least processor(s) 331, communication interface(s) 332, and memory 333. A data bus may interconnect processor(s) 331, communication interface(s) 332, and memory 333. Communication interface(s) 332 may be one or more network interfaces configured to support communications between order service computing device 330 and one or more of user computing devices 311-314, order system computing device 320, geo computing platforms 341-343, and computing service devices 351-353 and one or more networks (e.g., network 360).

Memory 333 may include one or more databases 334a, which may enable processor(s) 331 of order service computing device 330 to store, manage, and/or otherwise maintain data generated during the multi-geographical processing of user requests and performance of the other functions described herein. Furthermore, memory 333 may include one or more program modules having instructions that when executed by processor(s) 331 cause order service computing device 330 to perform one or more functions described herein. In some instances, the one or more program modules and/or databases may be stored by and/or maintained in different memory units of order service computing device 330. For example, memory 333 may have, store, and/or include at least databases 334a, user account module 334b, user request processing module 334c, and access request processing module 334d.

Databases 334a may be one or more data structures which enable order service computing device 330 to store, manage, and/or otherwise maintain data generated during the multi-geographical processing of user requests and performance of the other functions described herein. In particular, databases 334a may include information as related to user requests and access requests. In some instances, databases 334a may store user account information corresponding to users of user computing devices 311-314, as well as identifiers, such as logical serial numbers, corresponding to one or more service offerings indicated by one or more access requests received from user computing devices 311-314.

User account module 334b may have instructions that direct and/or cause order service computing device 330 to create a user account in the event that a user account does not exist. In some arrangements, user account module 334 may have further instructions that direct and/or cause order computing device 330 to associate an existing user account with one or more user requests and/or access requests corresponding to the user account. Furthermore, user account module 334b may store other instructions which cause order service computing device 330 to perform one or more other functions as described herein.

User request processing module 334c may have instructions that direct and/or cause order service computing device 330 to receive user requests from user computing devices 311-314 and/or order system computing device 320, process the user requests to identify whether the user requests are associated with existing accounts, and initiate user account creation steps by activating user account module 334b in the event that the user requests are not related to existing user accounts. In some arrangements, user request processing module 334c may have further instructions which cause order service computing device 330 to identify whether or not the user requests are associated with existing accounts established in any of geo computing platforms 341-343, transmit notifications to user computing devices 311-314 responsive to identifying that the user accounts are not established in any of geo computing platforms 341-343, and receive responses to geo computing platform prompts included in the notifications. In some instances, user request processing module 334c may include further instructions which cause order service computing device 330 to perform one or more other functions described herein.

Access request processing module 334d may have instructions that direct and/or cause order service computing device 330 to receive access requests from user computing devices 311-314 and/or order system computing device 320 and provide the user account with access to one or more computing resources and/or computing services by generating identifiers, such as logical serial numbers, identifying computing service devices 351-353 corresponding to the one or more computing resources and/or computing services indicated by the access requests. In some instances, access request processing module 334d may include further instructions which cause order service computing device 330 to perform one or more other functions described herein.

In some arrangements, as will be described in further detail below, order service computing device 330 may be configured to interface with one or more of user computing devices 311-314, order system computing device 320, order service computing device 330, geo computing platforms 341-343, and computing service devices 351-353 to perform one or more aspects of the multi-geo processing of user requests and other functions as described herein. In such arrangements, user request processing module 334c, when executed by processors 331 of order service computing device 330, may cause order service computing device to receive a user request from order system computing device 320. Order service computing device 330 may process the user request based on instructions comprised in user request processing module 334c to identify whether the request is associated with an existing account. In the event that the request is not associated with an existing account, user request processing module 334b may cause order service computing device 330 to initiate user account module 334b to create a user account at order service computing device 330.

After account creation, order service computing device 330 may transmit a notification to one of user computing devices 311-314 based on instructions of user request processing module 334c. The notification may include one or more geo computing platform prompts through which a user of one of user computing devices 311-314 may select a geo computing platform from geo computing platforms 341-343 to serve as a base geo computing platform. Based on a user selection of a geo computing platform from geo computing platforms 341-343 through the one or more geo computing platform prompts, order service computing device 330 may transmit instructions to the selected base geo computing platform to establish the user account based on instructions stored in user request processing module 334c.

Access request processing module 334d may cause order service computing device 330 to receive one or more access requests from order system computing device 320 corresponding to computing resources and/or computing services provided by one or more service computing devices 351-353. Order service computing device 330 may generate one or more identifiers, such as logical serial numbers, identifying the one or more one or more computing service devices 351-353 corresponding to the one or more access requests based on instructions of access request processing module 334d. In doing so, order service computing device 330 of multi-geo user request processing system 300 may link the user account to each of the one or more service offerings across the plurality of geographical regions through the one or more identifiers.

In some instances, multi-geographical request processing system 300 described above in regard to FIG. 3A and order service computing device 330 described in regard to FIGS. 3A and 3B may be used in accordance with one or more aspects described herein in one or more implementations. For example, multi-geographical request processing system 300 and order service computing device 330 may be used to associate a user account with a single geo computing platform and to further localize data storage at a single geo computing platform, as well as computer resource and/or computer service provisioning associated with the single geo computing platform, in order to provide enhanced security, compartmentalization, and/or to abide by constraints associated with general data protection regulation (e.g., GDPR), privacy compliance, billing, and the like. Multi-geo configurations may be used as well. For example, multi-geographical request processing system 300 and order service computing device 330 may be used without departure from the disclosure provided herein. For instance, multi-geographical request processing system 300 and order service computing device 330 may be used to facilitate multinational currency exchange, perform cross-border payment processing operations, provide international private network access, handle enterprise operational logistics, and so forth, when used in a multi-geo configuration. In yet other configurations, one or more services may be provided in one geo, and one or more different services may be provided in a second geo.

FIGS. 4A, 4B, 4C, 4D, 4E, 4F, 4G, 4H, 4I, and 4J depict an illustrative event sequence performed by the illustrative multi-geographical user request processing system that may be used in accordance with one or more aspects described herein. Each of the events described below in regard to FIGS. 4A-4J may be performed in the order described, or in any other order.

Figure 4A:
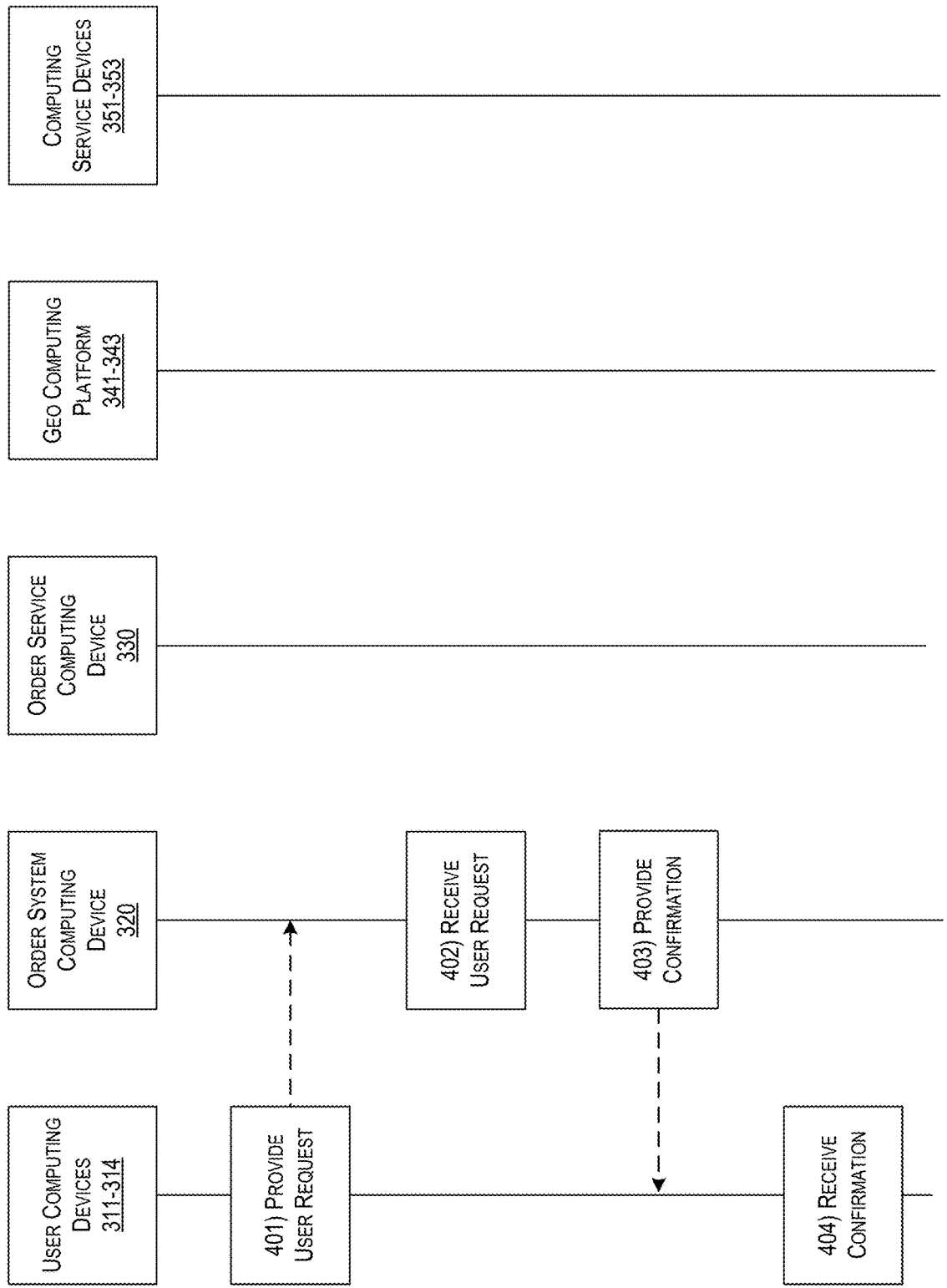

Referring to FIG. 4A, at step 401, at least one of user computing devices 311-314 may provide a user request (e.g., first user request) to order system computing device 320. The user request may include an order for general computing services provided by one or more of order system computing device 320, order service computing device 330, geo platform computing devices 341-343, and/or computing service devices 351-353. In some instances, the user request may be associated with a user of at least one of user computing devices 311-314.

At step 402, order system computing device 320 may receive the user request from at least one of user computing devices 311-314. In some instances, order system computing device 320 may process financial related aspects of the user request to charge the user of at least one of user computing devices 311-314 for the general computing services provided by one or more order system computing device 320, order service computing device 330, geo platform computing devices 341-343, and/or computing service devices 351-353. At step 403, order system computing device 320 may provide a confirmation to the at least one of user computing devices 311-314 to signify that the user request has been received and, in some instances, that financial aspects of the user request have been processed by order system computing device 320. At step 404, the at least one of user computing device 311-314 may receive the confirmation from order system computing device 320 indicating that the user request has been received and, in some instances, that the financial aspects of the user request have been processed.

Referring to FIG. 4B, at step 405, order system computing device 320 may forward and/or provide the user request from the at least one of user computing devices 311-314 associated with the user to order service computing device 330. At step 406, order service computing device 330 may receive the user request from order system computing device 320.

At step 407, order service computing device 330 may process the user request provided by the user of the at least one of user computing devices 311-314. In particular, processors 331 of order service computing device 330 may execute instructions of user request processing module 334c to identify whether the user request is associated with an existing account. In the event that the user request is not associated with an existing account, at step 408, instructions of user request processing module 334c may cause order service computing device 330 to initiate user account module 334b to create a user account at order service computing device 330 associated with the user of the at least one of user computing devices 311-314. In creating the user account, user account module 334b may cause order service computing device 330 to create a user account entry in databases 334a corresponding to the user of the at least one of user computing devices 311-314. The user account entry may further associate the user account with the user request which precipitated the creation of the user account. Alternatively, in the event that the user request is associated with an existing account, performance of step 408 may be omitted and the event sequence may proceed to step 409.

Referring to FIG. 4C, at step 409, order service computing device 330 may identify whether the user account has been established at a base geo computing platform of geo computing platforms 341-341 (e.g., whether the user account has been established at a particular geo computing platform). In the event that the user account has not been established at a base geo computing platform, at step 410, instructions of user request processing module 334c may cause order service computing device 330 to transmit a notification to the at least one of user computing devices 311-314. In some instances, the notification may include a plurality of geo computing platform prompts each respectively corresponding to one of geo computing platforms 341-343. Through interaction with a particular geo computing platform prompt of the plurality of geo computing platform prompts, a user of the at least one of user computing devices 311-314 may indicate that a base geo computing platform of geo computing platforms 341-343 corresponding to the indicated particular geo computing platform prompt is to be established. In the event that the user account has been established at a base geo computing platform, the event sequence may proceed to step 418.

At step 411, the at least one of user computing devices 311-314 may receive the notification comprising the plurality of geo computing platform prompts from order service computing device 330. At step 412, the user of the at least one of user computing devices 311-314 may provide a response to the notification, which may include a selection of a particular geo computing platform prompt. Such a selection may indicate that a base geo computing platform of geo computing platforms 341-343 corresponding to the selected particular geo computing platform prompt is to be established.

Referring to FIG. 4D, at step 413, order service computing device 330 may receive the response from the at least one of user computing devices 311-314. At step 414, order service computing device 330 may update database 433a to reflect the user selection of the base geo computing platform of geo computing platforms 341-343. In particular, instructions of user request processing module 334c may cause order service computing device 330 activate user account module 334b to update the user account entry in databases 334a corresponding to the user of the at least one of user computing devices 311-314. The user account entry may further associate the user account with the base geo computing platform of geo computing platforms 341-343.

At step 415, instructions of user request processing module 334c may cause order service computing device 330 to transmit instructions to the base geo computing platform of geo computing platforms 341-343 selected by the user to establish the user account associated with the user of the at least one of user computing devices 311-314. In particular, the order service computing device 330 may command the base geo computing platform to establish the user account in memory. In some instances, the instructions may comprise commands which cause the base geo computing platform of geo computing platforms 341-343 to create a duplicate user account, similar to the user account created at order service computing device 330. The duplicate account may enable the user of the at least one of user computing devices 311-314 to access the base geo computing platform and perform the general computing services provided by the base geo computing platform of geo computing platforms 341-343. At step 416, the base geo computing platform may receive the instructions from order service computing device 330.

Referring to FIG. 4E, at step 417, the base geo computing platform of geo computing platforms 341-343 may establish the user account, based on the instructions received from order service computing device 330 at step 416. In some instances, the base geo computing platform may create a duplicate user account, similar to the user account created at order service computing device 330, which may enable the user of the at least one of user computing devices 311-314 to access the base geo computing platform and perform the general computing services provided.

At step 418, based on user input, the at least one of user computing devices 311-314 may transmit a first access request to order system computing device 320. The first access request may be for computing resources and/or computing services provided by a first computing service device of computing service devices 351-353. In some instances, the first computing service device of computing service devices 351-353 may be provided through the base geo computing platform selected by the user. Alternatively, however, the first computing service device of computing service devices 351-353 may not be provided through the base geo computing platform selected by the user and instead may be provided through another geo computing platform of geo computing platforms 341-343. In some instances, the computing resources and/or computing services detailed by the first resource request may be provided by a plurality of computing service devices 351-353. In such instances, the first access request may further include a selection of a particular geo computing platform 341-343 to serve as the geo computing platform through which the user would like to receive the computing resources and/or computing services detailed by the first resource request. In certain arrangements, the at least one of user computing devices 311-314 may provide the first access request to one of order service computing device 330, the base geo computing platform of geo computing platforms 341-343, the first computing service device of computing service devices 351-353 corresponding to the first access request, and/or the geo computing platform of geo computing platforms 341-343 associated with the first computing service device.

At step 419, order system computing device 320 may receive the first access request from at least one of user computing devices 311-314. In some instances, order system computing device 320 may process financial related aspects of the first access request to charge the user of at least one of user computing devices for the computing services and/or computing resources provided by first computing service device of computing service devices 351-353. At step 420, order system computing device 320 may provide a confirmation to the at least one of user computing devices 311-314 to signify that the first access request has been received and, in some instances, that financial aspects of the first access request have been processed by order system computing device 320.

Figure 4F:
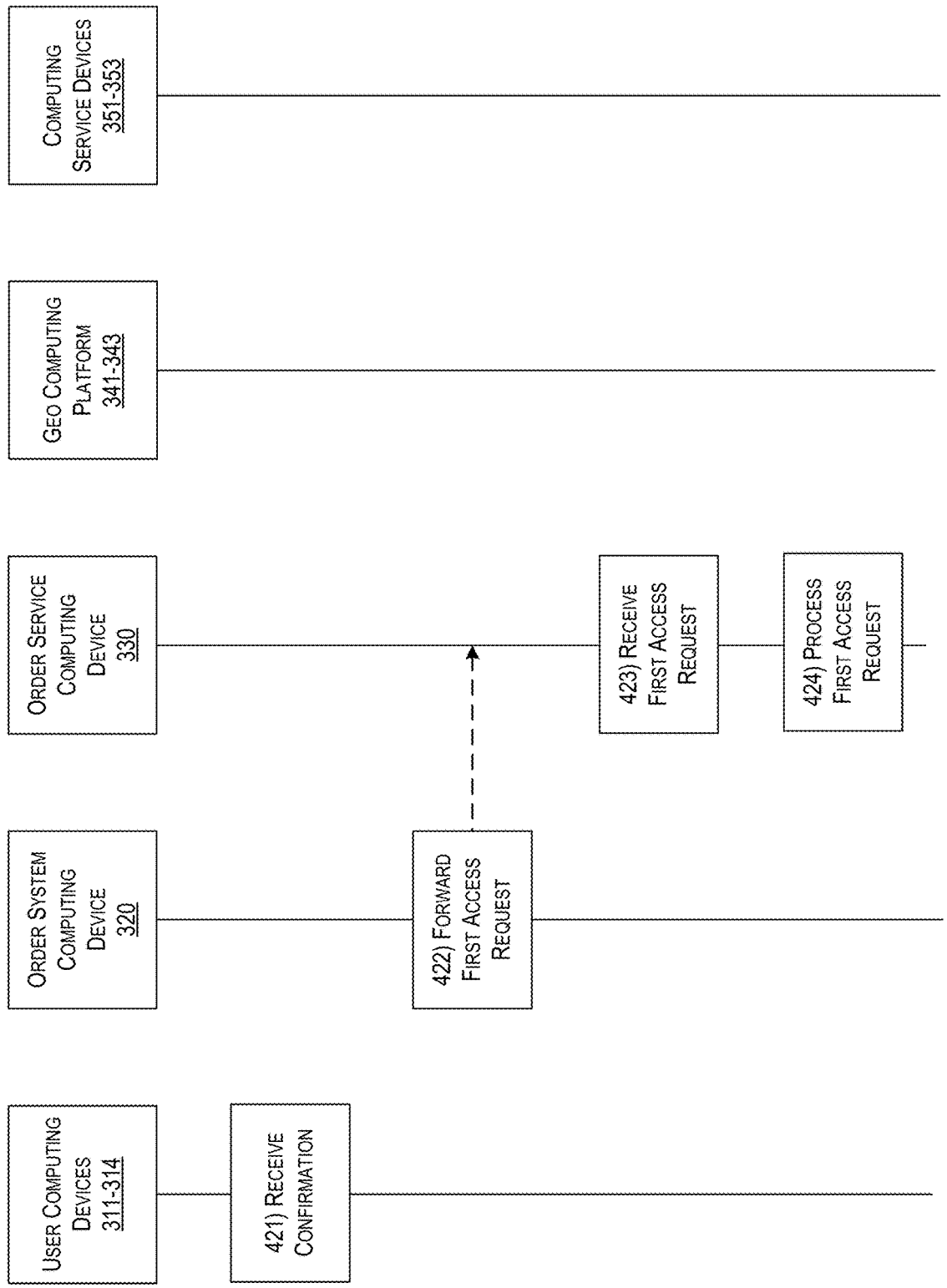

Referring to FIG. 4F, at step 421, the at least one of user computing device 311-314 may receive the confirmation from order system computing device 320 indicating that the access request has been received. At step 422, order system computing device 320 may forward and/or provide the first access request from the at least one of user computing devices 311-314 associated with the user to order service computing device 330. At step 423, order service computing device 330 may receive the first access request from order system computing device 320. At step 424, order service computing device 330 may process the first access request provided by the user of the at least one of user computing devices 311-314.

Referring to FIG. 4G, at step 425, processors 331 of order service computing device 330 may execute instructions of access request processing module 334d that cause order service computing device 330 to identify an identifier of the first computing service device of computing service devices 351-353. In some instances, the identifier may be a serial number associated with the first computing service device. Memory 333 of order service computing device 330 may store identifiers of each of computing service devices 351-353 and, in identifying the identifier of the first computing service device, order service computing device 330 may query memory 333 to identify the identifier of the first computing service device.

Alternatively, at step 426, order service computing device 330 may request the identifier from the first computing service device of computing service devices 351-353. At step 427, the first computing service device of computing service devices 351-353 may receive the identifier request from order service computing device 330. At step 428, the first computing service device of computing service devices 351-353 may provide the identifier to order service computing device 330. In some instances, the identifier may be a serial number associated with the first computing service device. Referring to FIG. 4H, at step 429, order service computing device 330 may receive the identifier from the first computing service device of computing service devices 351-353. It should be understood, however, that steps 426-429 need not be performed in the event that the identifier is associated with the first computing service device is stored in memory 333 of order service computing device 330.

Furthermore, in some arrangements, the geo computing platform 341-343 corresponding to the first computing service device of computing service devices 351-353 may facilitate the identification of the identifier between order service computing device 330 and the first computing service device of computing service devices 351-353. As such, the geo computing platform may receive the identifier request from order service computing device 330, forward the identifier request to the first computing service device, receive the identifier from the first computing service device, and provide the identifier to order service computing device 330. Additionally and/or alternatively, the geo computing platform 341-343 corresponding to the first computing service device of computing service devices 351-353 may store the identifier corresponding to the first computing service device. In such instances, order service computing device 330 may request the identifier for the first computing service device from the geo computing platform 341-343 corresponding to the first computing service device.

At step 430, processors 331 of order service computing device 330 may execute instructions of access request processing module 334*d* that cause order service computing device 330 to generate a first identifier corresponding to the identifier of the first computing service device of computing service devices 351-353. In some instances, the generated first identifier may serve as a unique identifier for the user, the first access request, the first computing service device, and, in some instances, the geo computing platform 341-343 corresponding to the first computing service device. Furthermore, the first identifier may encapsulate the terms of the first access request including a number of accounts associated with the user able to access the first computing service device, a duration of the permitted access to the first computing service device, and so on. In some instances, the first identifier may provide the user with access to the computing services and/or computing resources of the first computing service device.

Additionally and/or alternatively, and as stated above, the identifier of the first computing service device of computing service devices 351-353 may be a serial number of the first computing service device, and the first identifier may be a first logical serial number. In such arrangements, processors 331 of order service computing device 330 may execute instructions of access request processing module 334*d* that cause order service computing device 330 to generate a first logical serial number corresponding to the serial number of the first computing service device of computing service devices 351-353. In some instances, the generated first logical serial number may serve as a unique identifier for the user, the first access request, the first computing service device, and, in some instances, the geo computing platform 341-343 corresponding to the first computing service device. Furthermore, the first logical serial number may encapsulate the terms of the first access request including a number of accounts associated with the user able to access the first computing service device, a duration of the permitted access to the first computing service device, and so on.

At step 431, processors 331 of order service computing device 330 may execute instructions of access request processing module 334*d* that cause order service computing device 330 to store the first identifier in databases 334*a*. In particular, order service computing device 330 may associate the first identifier with the user account entry corresponding to the user of the at least one of user computing devices 311-314. Through the first identifier, order service computing device 330 may be able to edit and/or update the terms of the first access request for the user and corresponding to the first computing service device.

At step 432, order service computing device 330 may transmit the first identifier to the at least one of user computing devices 311-314 of the user. In some arrangements, however, the first identifier may be provided to the at least one of user computing devices 311-314 along with the confirmation provided at step 420. In such arrangements, the processes performed in steps 422-431 may be performed prior to transmitting the confirmation to the at least one user computing device 311-314. Furthermore, the confirmation may be provided order system computing device 320 and/or order service computing device 330. In instances in which order system computing device 320 provides the confirmation with the first identifier, order service computing device 330 may provide the first identifier to order system computing device 320.

Referring to FIG. 4H, at step 433, the at least one of user computing devices 311-314 may receive the first identifier from order service computing device 330. At step 434, at least one of user computing devices 311-314 may provide another user request (e.g., second user request) to order system computing device 320. The user request may include an updated order for the computing services and/or computing resources provided by the first computing service device of computing service devices 351-353, as well as the first identifier. Alternatively, the updated order may be encapsulated by an updated access request. In some instances, the user request may be associated with the user of at least one of user computing devices 311-314.

At step 435, order system computing device 320 may receive the user request from the at least one of user computing devices 311-314. In some instances, order system computing device 320 may process financial related aspects of the user request to charge the user of at least one of user computing devices 311-314 for the updated order for the computing services and/or computing resources provided by the first computing service device of computing service devices 351-353. At step 436, order system computing device 320 may provide a confirmation to the at least one of user computing devices 311-314 to signify that the updated order for the computing services and/or computing resources provided by the first computing service device has been processed by order system computing device 320.

Referring to FIG. 4J, at step 437, the at least one of user computing device 311-314 may receive the confirmation from order system computing device 320 indicating that the updated order has been received. At step 438, order system computing device 320 may forward and/or provide the user request from the at least one of user computing devices 311-314 associated with the user to order service computing device 330. At step 439, order service computing device 330 may receive the user request from order system computing device 320. In some arrangements, as stated above, the user request may include the first identifier. At step 440, order service computing device 330 may process the user request provided by the user of the at least one of user computing devices 311-314. In particular, processors 331 of order service computing device 330 may execute instructions of user request processing module 334*c* and/or access request processing module 334*d* to identify the user account entry in database 334a based on the received first identifier and update the first logical serial stored in database 334a and associated with the user account entry to reflect the updated order for the computing services and/or computing resources provided by the first computing service device of computing service devices 351-353.

One or more of steps 418-440 may be performed in the manner described above for additional access requests provided by the user of at least one of user computing devices 311-314. For example, the user may provide one or more other access requests (e.g., second access, third access request, and so on) for access to computing services and/or computing resources provided by one or more other computing service devices 351-353 (e.g., second computing service device, third computing service device, and so on. In some instances, the one or more other computing service devices 351-353 may be associated with the base geo computing platform identified by the user and/or other geo computing platforms 341-343. For each of the one or more other access requests, one or more other identifiers may be identified (e.g., second identifier, third identifier, and so on). In some instances, the user may provide one or more user requests including one or more updated orders for the one or more computing services and/or computing resources. Order service computing device 330 may accordingly update the one or more identifiers to reflect one or more updated orders.

Figure 5:
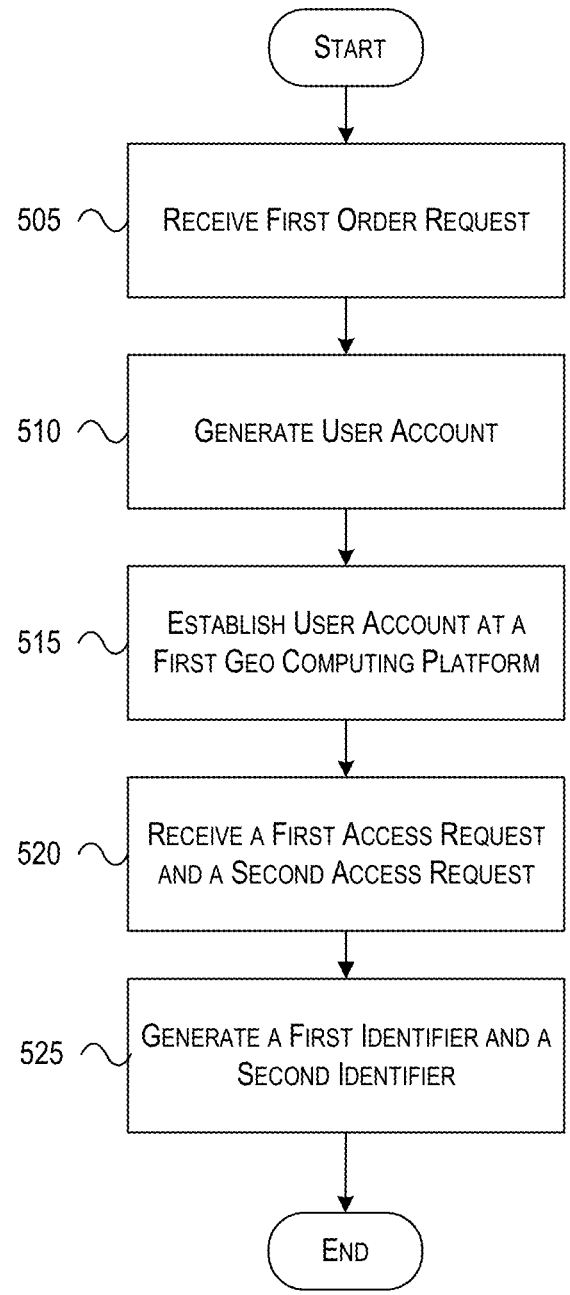
FIG. 5 depicts an illustrative method performed by the illustrative multi-geographical user request processing system in accordance with one or more aspects described herein.

FIG. 5 depicts an illustrative method performed by the illustrative multi-geographical user request processing system in accordance with one or more aspects described herein. Referring to FIG. 5, at step 505, an order service computing device may receive, from an order system computing device, a first user request associated with a user. At step 510, based on the first user request, the order service computing device may generate a user account associated with the user. At step 515, the order service computing device may establish the user account at a first geo computing platform of a plurality of geo computing platforms, wherein each geo computing platform of the plurality of geo computing platforms provides access to one or more resources. At step 520, the order service computing device may receive, from the order system computing device, a first access request a first access request for a first resource corresponding to the first geo computing platform and second access request for a second resource corresponding to a second geo computing platform, wherein the first access request and second access request are associated with the user account. At step 525, the order service computing device may generate a first identifier that identifies the first resource corresponding to the first geo computing platform from the first access request and a second identifier that identifies the second resource corresponding to the second geo computing platform from the second access request.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
receiving, from an order system computing device, a first user request associated with a user;
based on the first user request, generating a user account associated with the user;
establishing the user account at a first geo computing platform of a plurality of geo computing platforms, wherein each geo computing platform of the plurality of geo computing platforms provides access to a different set of one or more resources;
receiving, from the order system computing device, a first access request for a first resource corresponding to the first geo computing platform and second access request for a second resource corresponding to a second geo computing platform, wherein the first access request and second access request are associated with the user account;
generating a first identifier that identifies the first resource corresponding to the first geo computing platform from the first access request and a second identifier that identifies the second resource corresponding to the second geo computing platform from the second access request;
identifying that the first user request is not associated with an existing account established in a geo computing platform of the plurality of geo computing platforms;
transmitting a notification to a user computing device associated with the user request, wherein the notification includes a geo computing platform prompt; and
based on the geo computing platform prompt, receiving, from the user computing device, a selection of the first geo computing platform of the plurality of geo computing platforms.

2. The method of claim 1, further comprising:
receiving, from the order system computing device, a third access request for a third resource corresponding to a third geo computing platform, wherein the third access request is associated with the user account; and
generating a third identifier that identifies the third resource corresponding to the third geo computing platform from the third access request.

3. The method of claim 1, wherein the user account associated with the user comprises the first identifier and the second identifier.

4. The method of claim 1, further comprising:
receiving, from the order system computing device, a second user request associated with the user account, wherein the second user request comprises an update to one of the first access request and the second access request; and
based on the update, updating one of the first identifier and the second identifier.

5. The method of claim 1, wherein the first identifier provides access to the first resource corresponding to the first geo computing platform and the second identifier provides access to the second resource corresponding to the second geo computing platform.

6. The method of claim 1, wherein the first geo computing platform and the second geo computing platform are located in different geographical regions and wherein the first identifier is a first logical serial number and the second identifier is a second logical serial number.

7. An apparatus, comprising:
a processor;
a memory storing computer-readable instructions that, when executed by the processor, cause the apparatus to:
receive, from an order system computing device, a first user request associated with a user;
based on the first user request, generate a user account associated with the user;
establish the user account at a first geo computing platform of a plurality of geo computing platforms, wherein each geo computing platform of the plurality of geo computing platforms provides access to one or more resources;

receive, from the order system computing device, a first access request for a first resource corresponding to the first geo computing platforms and second access request for a second resource corresponding to a second geo computing platform, wherein the first access request and second access request are associated with the user account;

generate a first identifier that identifies the first resource corresponding to the first geo computing platform from the first access request and a second identifier that identifies the second resource corresponding to the second geo computing platform from the second access request;

identify that the user request is not associated with an existing account established in a geo computing platform of the plurality of geo computing platforms;

transmit a notification to a user computing device associated with the user request, wherein the notification includes a geo computing platform prompt; and based on the geo computing platform prompt, receive, from the user computing device, a selection of the first geo computing platform of the plurality of geo computing platforms.

8. The apparatus of claim 7, wherein the memory stores further computer-readable instructions that, when executed by the processor, cause the apparatus to:

receive, from the order system computing device, a third access request for a third resource corresponding to a third geo computing platform, wherein the third access request is associated with the user account; and generate a third identifier that identifies the third resource corresponding to the third geo computing platform from the third access request.

9. The apparatus of claim 7, wherein the user account associated with the user comprises the first identifier and the second identifier.

10. The apparatus of claim 7, wherein the memory stores further computer-readable instructions that, when executed by the processor, cause the apparatus to:

receive, from the order system computing device, a second user request associated with the user account, wherein the second user request comprises an update to one of the first access request and the second access request; and based on the update, update one of the first identifier and the second identifier.

11. The apparatus of claim 7, wherein the first identifier provides access to the first resource corresponding to the first geo computing platform and the second identifier provides access to the second resource corresponding to the second geo computing platform.

12. The apparatus of claim 7, wherein the first geo computing platform and the second geo computing platform are located in different geographical regions and wherein the first identifier is a first logical serial number and the second identifier is a second logical serial number.

13. One or more non-transitory computer-readable media storing instructions that, when executed by a computing device comprising at least one processor and memory, cause the computing device to:

receive, from an order system computing device, a first user request associated with a user;

based on the first user request, generate a user account associated with the user;

establish the user account at a first geo computing platform of a plurality of geo computing platforms, wherein each geo computing platform of the plurality of geo computing platforms provides access to one or more resources;

receive, from the order system computing device, a first access request for a first resource corresponding to the first geo computing platform and second access request for a second resource corresponding to a second geo computing platform, wherein the first access request and second access request are associated with the user account;

generate a first identifier that identifies the first resource corresponding to the first geo computing platform from the first access request and a second identifier that identifies the second resource corresponding to the second geo computing platform from the second access request;

identify that the user request is not associated with an existing account existing in a geo computing platform of the plurality of geo computing platforms;

transmit a notification to a user computing device associated with the user request, wherein the notification includes a geo computing platform prompt; and based on the geo computing platform prompt, receive, from the user computing device, a selection of the first geo computing platform of the plurality of geo computing platforms.

14. The one or more non-transitory computer-readable media of claim 13 storing further instructions that, when executed by the computing device comprising the at least one processor and memory, cause the computing device to:

receive, from the order system computing device, a third access request for a third resource corresponding to a third geo computing platform, wherein the third access request is associated with the user account; and generate a third identifier that identifies the third resource corresponding to the third geo computing platform from the third access request.

15. The one or more non-transitory computer-readable media of claim 13, wherein the user account associated with the user comprises the first identifier and the second identifier.

16. The one or more non-transitory computer-readable media of claim 13, storing further instructions that, when executed by the computing device comprising the at least one processor and memory, cause the computing device to:

receive, from the order system computing device, a second user request associated with the user account, wherein the second user request comprises an update to one of the first access request and the second access request; and based on the update, update one of the first identifier and the second identifier.

17. The one or more non-transitory computer-readable media of claim 13, wherein the first identifier provides access to the first resource corresponding to the first geo computing platform and the second identifier provides access to the second resource corresponding to the second geo computing platform.

* * * * *